(12) United States Patent
Richter et al.

(10) Patent No.: US 10,158,131 B2
(45) Date of Patent: Dec. 18, 2018

(54) METHOD FOR PREPARING TO START A FUEL CELL SYSTEM

(71) Applicant: DAIMLER AG, Stuttgart (DE)

(72) Inventors: Holger Richter, Kirchheim (DE); Armin Mütschele, Weilheim (DE)

(73) Assignee: DAIMLER AG, Stuttgart (DE)

( * ) Notice: Subject to any disclaimer, the term of this patent is extended or adjusted under 35 U.S.C. 154(b) by 287 days.

(21) Appl. No.: 15/031,164

(22) PCT Filed: Oct. 14, 2014

(86) PCT No.: PCT/EP2014/002772
§ 371 (c)(1),
(2) Date: Apr. 21, 2016

(87) PCT Pub. No.: WO2015/058842
PCT Pub. Date: Apr. 30, 2015

(65) Prior Publication Data
US 2016/0276683 A1    Sep. 22, 2016

(30) Foreign Application Priority Data
Oct. 22, 2013   (DE) ........................ 10 2013 017 543

(51) Int. Cl.
| H01M 8/04303 | (2016.01) |
| H01M 8/04119 | (2016.01) |
| H01M 8/04223 | (2016.01) |
| H01M 8/0432 | (2016.01) |
| H01M 8/04537 | (2016.01) |
| H01M 8/04746 | (2016.01) |
| H01M 8/04228 | (2016.01) |

(52) U.S. Cl.
CPC ... *H01M 8/04303* (2016.02); *H01M 8/04179* (2013.01); *H01M 8/04228* (2016.02); *H01M 8/04231* (2013.01); *H01M 8/04253* (2013.01); *H01M 8/04358* (2013.01); *H01M 8/04619* (2013.01); *H01M 8/04753* (2013.01); *H01M 2250/20* (2013.01); *Y02T 90/32* (2013.01)

(58) Field of Classification Search
CPC ......... H01M 8/04303; H01M 8/04179; H01M 8/04231; H01M 8/04253; H01M 8/04358; H01M 8/04619; H01M 8/04753; H01M 8/04228; H01M 2250/20; Y02T 90/32
See application file for complete search history.

(56) References Cited

U.S. PATENT DOCUMENTS

| 7,867,642 B2 | 1/2011 | Falta | |
| 8,277,999 B2 | 10/2012 | Izutani et al. | |
| 8,524,406 B2 | 9/2013 | Tanaka et al. | |
| 2006/0222924 A1* | 10/2006 | Matsuoka | H01M 4/8605 429/413 |
| 2009/0029200 A1* | 1/2009 | Izutani | H01M 8/04164 429/415 |
| 2010/0028728 A1* | 2/2010 | Clingerman | H01M 8/04126 429/411 |
| 2010/0167144 A1 | 7/2010 | Kaito et al. | |
| 2010/0190071 A1* | 7/2010 | Kaito | H01M 8/06 429/429 |
| 2015/0219025 A1 | 8/2015 | Koch | |

FOREIGN PATENT DOCUMENTS

| CN | 101379644 A | | 3/2009 |
| CN | 1013796644 | * | 3/2009 |
| DE | 102007050856 A1 | | 5/2008 |
| DE | 112007000300 T5 | | 11/2008 |
| DE | 112010000819 T5 | | 5/2012 |
| DE | 102012001947 | * | 8/2013 |
| DE | 102012001947 A1 | | 8/2013 |
| EP | 2898207 B1 | | 3/2016 |
| JP | 2007207716 A | | 8/2007 |
| JP | 2008010348 | * | 1/2008 |
| JP | 2008010348 A | | 1/2008 |

OTHER PUBLICATIONS

JP2008010348 MT.*
14792388,Decision_to_grant_a_European_patent,Nov. 16, 2017 (Year: 2017).*
2016524428,Decision_to_Grant_a_Patent_(Translated),Oct. 24, 2017 (Year: 2017).*
German Search Report dated Mar. 13, 2014 in related German Application No. 102013017543.7.
International Search Report dated Jan. 8, 2015 in related International Application No. PCT/EP2014/002772.
Written Opinion dated Jan. 8, 2015 in related International Application No. PCT/EP2014/002772.
Office Action dated Jun. 2, 2017 in related CN Application No. 201480057979.4 (reference JP 2008-10348 previously cited in IDS filed on Apr. 21, 2016).
Office Action dated Feb. 7, 2017 in related JP Application No. 2016-524428.

* cited by examiner

*Primary Examiner* — Alexander Usyatinsky
(74) *Attorney, Agent, or Firm* — Patent Portfolio Builders PLLC

(57) ABSTRACT

A method for preparing a fuel cell system for a starting operation involves performing a start preparation routine when switching off of the fuel cell system and/or when the temperature falls short of a predetermined temperature threshold value in order to discharge water and moisture from the fuel cell system. The start preparation routine is changed in accordance with measured values detected within a predetermined time interval before the stopping of the fuel cell system.

10 Claims, 1 Drawing Sheet

Figures 1, 2:
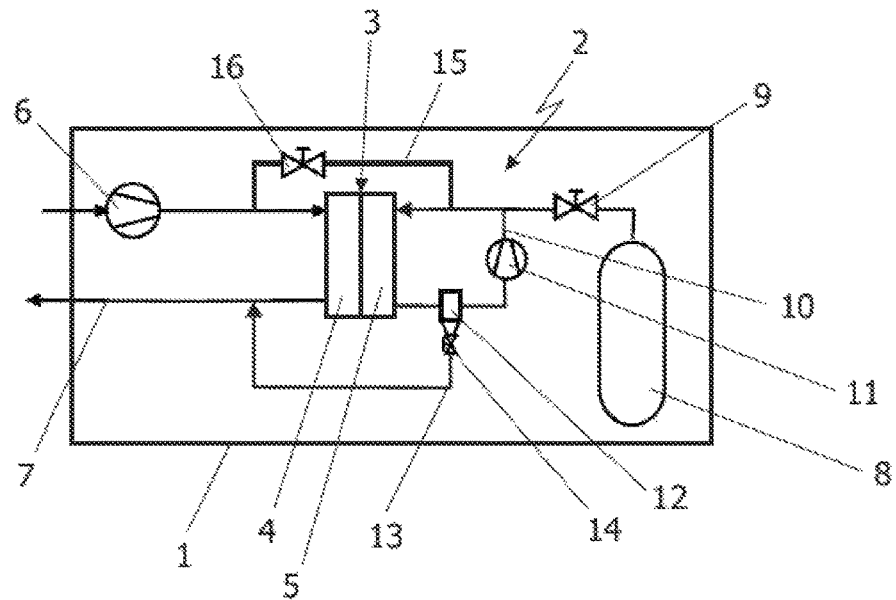

| Classes | Load state | Time for SVR |
|---------|------------|--------------|
| Class 1 | "Full load" | $t_1$ |
| Class 2 | "2/3 load" | $t_2$ |
| Class 3 | "1/3 load" | $t_3$ |
| Class 4 | "Low load" | $t_4$ |

$t_1 = 0$   or   $t_1 = 0$   and   $t_1 \ll t_4$ $t_1 < t_2 < t_3 < t_4$

METHOD FOR PREPARING TO START A FUEL CELL SYSTEM

BACKGROUND AND SUMMARY OF THE INVENTION

Exemplary embodiments of the invention relate to a method for preparing to start a fuel cell system for a starting operation carried out in the event of switching off of the fuel cell system and/or in the event of the temperature falling short of a predetermined temperature threshold value, in order to discharge water and moisture from the fuel cell system.

Fuel cell systems are known to be used, for example, in vehicles to provide electrical drive power. One of the problems of fuel cell systems is the production of very pure water in the fuel cell system during operation. If temperatures fall below freezing point, which will inevitably happen in vehicle applications, the fuel cell system can freeze, which then causes corresponding problems in the event of a repeated starting operation or it requires a very long time until the fuel cell system can be started. This is because, due to moisture that has condensed out and frozen, for example gas ducts and/or valves can be blocked and functioning of other components can be impaired by the formation of ice.

A known solution to counteract this problem during the preparation of a fuel cell system for a starting operation, is to perform a start preparation routine when the fuel cell system is switched off in order to discharge water and moisture from the fuel cell system. The fuel cell system is typically flushed with gas, which is conveyed, for example, by the air conveying device and/or a hydrogen recirculation fan or another type of fan. In this way moisture is blown out of the fuel cell system and any water separators and the like can be emptied and flushed through in order also to discharge as much moisture as possible. During stoppage and the subsequent switch-off process fuel cell systems are typically still very hot, so that vapor potentially remains in the fuel cell system and can be condensed out later and, if the temperatures then fall below freezing point, can likewise lead to the problems described above. Therefore, in addition to or as an alternative to the start preparation routine described above it is also known to perform a start preparation routine when the fuel cell system is stopped. For this purpose, if, for example, the ambient temperature drops below a predetermined threshold value the fuel cell system is, for example, activated in order to then perform the start preparation routine and to dry the system. In contrast to drying immediately after the shutdown of the fuel cell system, this start preparation routine, which is frequently also designated as conditioning or downtime conditioning, also has the advantage that water that has condensed out can also be removed. Therefore, it is quite reasonable to carry out both routines.

According to the general prior art, the start preparation routine will typically always run following the same pattern, as a predetermined quantity of gas, for example air, is conveyed through the fuel cell system in order to discharge moisture and to blow water out. In order to achieve this, for example, all gas conveying equipment can be run at constant rotational speed for a predetermined time. In this case the quantity is typically always designed so that secure and reliable drying can be achieved in any case.

German patent document DE 10 2007 050 856 A1 discloses a method that performs the flushing in a very complex manner as a function of membrane hydration and average current density time profiles and the like. This is extraordinarily expensive and complex and can only be operated at considerable expense for detection of the required measured values, in particular for a start preparation routine that is carried out for downtime conditioning.

Moreover, the generic prior art, which includes German patent document DE 11 2007 000 300 T5, US patent document US 2006/222924 A1, and German patent document DE 10 2012 01947 A1, discloses a method in which the start preparation routine is adapted with reference to measured values which have been recorded during the operation of the fuel cell system.

Exemplary embodiment of the present invention are directed to a method for preparing a fuel cell system for a starting operation using a start preparation routine that functions very simply and efficiently and can be carried out very quickly, quietly and in an energy-efficient manner.

In the method according to the invention the start preparation routine is changed as a function of measured values in the fuel cell system. In this case these measured values are recorded within a predetermined time interval before the shutdown of the fuel cell system. Before the shutdown of the fuel cell system, when this is still in operation, measured values can be very simply recorded or are typically available in any case for specific control objectives and for influencing operating procedures in the fuel cell system. These measured values, which are in any case available, or the measured values which are simply to be detected, can then be used in order to adapt the system preparation routine accordingly. The crux of the idea behind it is that in a full load situation of the fuel cell system, for example in a time interval of approximately 15 minutes before the shutdown of the fuel cell system, much less moisture remains in the fuel cell system, since temperatures and volumetric flows are relatively high. Then a start preparation routine is dispensed with completely, or it is appropriately short or can be carried out at low rotational speeds of the gas conveying equipment for providing the air stream for drying the fuel cell system. This is energy-efficient, quick, and quiet. On the other hand, if the measured values recorded in the time interval before the shutdown of the fuel cell system indicate that a partial load situation or an extremely low load situation has occurred, then a very much more moist fuel cell system is to be expected, so that for careful drying of the fuel cell system the system preparation routine is carried out for a correspondingly longer time and/or at higher speeds of the gas conveying equipment. At least one intermediate stage exists therebetween. Thus because in the method the measured values are used that have been recorded within a predetermined time interval before the shutdown of the fuel cell system, an optimized system preparation routine, which is adapted in each case to the requirements of the fuel cell system with regard to energy requirement, noise emissions and time, can be used independently of a measurement during the system preparation routine itself.

In a very advantageous modification of the method according to the invention the measured values comprise cooling water temperatures in the fuel cell system. In addition to the mere evaluation of load requirements, in particular cooling water temperatures in the fuel cell system are values to be recorded very simply and efficiently and which are associated indirectly with the load requirements and directly with the situation with regard to the moisture that is present after the shutdown of the fuel cell system. Thus, a suitable start preparation routine can be selected very simply and efficiently for recording cooling water values.

In an advantageous modification thereof different cooling water temperature threshold values can be predetermined, wherein the measured values include the time for which the cooling water temperature was above the respective cooling water temperature threshold value. If, for example, the cooling water temperature within the last 15 minutes of the operation of the fuel cell system was 80% above an upper cooling water temperature threshold value of for example 60° C., then a very much shorter system preparation routine can be performed compared to when the cooling water temperature was only 10% above this upper cooling water temperature threshold value and in the rest of the time was above a lower cooling water temperature threshold value.

In a very favorable modification of the method according to the invention the measured values are assigned to individual classes according to the load situation and/or cooling water temperature of the fuel cell system within the time interval. A predetermined sequence of the system preparation routine is then assigned to each of the classes. Such an assignment to classes can take place immediately upon shutdown of the fuel cell system. Thus, for example, assignment to five different classes can take place, which symbolically represent full load, low load, low partial load, medium partial load and high partial load. Depending upon the load situation, a suitable system preparation routine can then be carried out upon shutdown of the fuel cell system and ideally upon downtime conditioning taking place later, possibly as a function of the temperature. Ideally in this case the measured values or the classes to which the measured values are assigned can be associated with the different system preparation routines by means of a characteristic field.

Further advantageous embodiments of the method according to the invention are disclosed by the rest of the dependent subordinate claims and are made clear with reference to an embodiment, which is described in greater detail below with reference to the drawings.

BRIEF DESCRIPTION OF THE DRAWING FIGURES

In the drawings:

FIG. 1 shows a vehicle with a fuel cell system which is suitable for carrying out the method according to the invention; and FIG. 2 shows a highly simplified characteristic field, which can be used for carrying out the method according to the invention.

DETAILED DESCRIPTION

FIG. 1 is a highly schematic illustration of a vehicle 1. The vehicle 1 can, by way of example, be a passenger car, truck, a rail vehicle or a forklift truck for logistics purposes. The vehicle 1 could just as well be used, for example, as a ship or aircraft. A schematically illustrated fuel cell system 2, of which the core forms a fuel cell 3, is located in the vehicle 1. This fuel cell 3 should be made up of a stack of individual PEM cells, a so-called fuel cell group or fuel cell stack. A cathode compartment 4 and an anode compartment 5 are symbolically indicated inside the fuel cell 3. For regular operation, air is delivered to the cathode compartment 4 by an air conveying device 6, for example an oxygen supplier. Exhaust air passes out of the fuel cell system 2 via an exhaust air duct 7. Hydrogen from a compressed gas storage tank 8 is delivered by a pressure regulating and metering unit 9 to the anode compartment 5 of the fuel cell 3. Unconsumed hydrogen, as well as inert gases and water that are produced in the region of the anode compartment 5, are returned by a recirculation duct 10 and can be combined with fresh hydrogen and again delivered to the anode compartment 5. In this case a recirculation conveyor 11 is disposed in the recirculation duct 10 and in the exemplary embodiment illustrated here is designed as a hydrogen recirculation blower or HRB. In this case the recirculation conveyor 11 could just as well be designed as a gas jet pump or as a combination of a gas jet pump and a blower.

Moreover, a water separator 12, which is connected by a drain conduit 13 having a valve device 14 to the exhaust air duct 7 from the fuel cell system 2, is located in the recirculation duct 10. Thus, the water separator 12 and the valve device 14 allow water to be collected and drained off, for example from time to time. It is likewise conceivable to drain off the water as a function of a filling level in the water separator or as a function of concentrations in the so-called anode circuit. Moreover, gas can also be drained off together with the water 14, since with time inert gas, which has diffused through the membranes of the fuel cell 3 from the cathode compartment 4 into the anode compartment 5, is enriched in the anode circuit. Since as a result the hydrogen concentration would fall in the anode circuit having a constant volume, this gas must likewise be drained off. This can take place using a discrete duct or together with the water using the drain conduit 13 and the valve device 14.

Moreover, FIG. 1 shows a connecting conduit 15 with a valve device 16 connecting the anode circuit to an air supply duct leading to the cathode compartment 4 of the fuel cell 3. Thus, when the valve device 16 is open, a connection between the cathode side and the anode side of the fuel cell system 2 can be created via the connecting conduit 15. Depending upon the arrangement and the design, the connecting conduit 15 can also be used, for example, to drain off the gas simultaneously with the draining off of water by the water separator 12 and the drain conduit 13, wherein the branch point would then typically be disposed between the water separator 12 and the recirculation conveyor 11. The introduction of the discharged gases into the air supply duct 17 is generally known and conventional, since thus any hydrogen that is typically always also drained off in small quantities reacts on the catalyst of the cathode compartment 4 and thus hydrogen emissions to the environment can be avoided.

For a start preparation routine SVR, which is carried out, for example, after the shutdown of the fuel cell system 2 while this system is switched off, or which is carried out in the form of a downtime conditioning as soon as temperatures in the surroundings of the vehicle 1 fall below a predetermined threshold value of, for example 3° C., the procedure is such that ideally the air conveying device 6 and the recirculation conveyor 11 are operated at a predetermined rotational speed, for example, with power from a battery (not shown here). As a result the cathode compartment 4 is correspondingly flushed through and a circulatory flow is produced in the anode circuit. If the valve device 16 on the connecting conduit is then opened, the anode side is also flushed through accordingly by the dry air, wherein ideally air and water are discharged by the water separator 12 and the water drainage duct 13 when the valve device 14 is open. As a result the fuel cell system 2 is correspondingly dried and can be prepared ideally for a restart, even if temperatures are below freezing point.

The start preparation routine, regardless of whether it is carried out upon switching off of the fuel cell system after the shutdown, or in the form of a downtime conditioning while the fuel cell system 2 or the vehicle 1 is not in operation, is always associated with the corresponding energy requirement for the air conveying device 6 or the recirculation conveyor 11 and causes a corresponding noise emission over the time period t over which the start preparation routine runs. In order to reduce both the energy requirement and also the noise emission, a series of measured values can be recorded and stored in the fuel cell system 1 during operation. These measured values may be, for example, the load demands made on the fuel cell system 2 by the vehicle 1. In particular, however, temperatures are recorded in the cooling water of the fuel cell system 2. In this case it is particularly simple and efficient if cooling water temperature threshold values are predetermined, for example two or three different threshold values in the temperature range that normally occurs during the regular operation. Now during the operation of the fuel cell system 2 it is possible in each case very simply and efficiently log the time periods for which the cooling water temperature is above the predetermined threshold values.

If the fuel cell system 2 or the vehicle 1 is now shut down, then an evaluation of precisely these recorded values can take place retrospectively for a predetermined time interval before the shutdown, for example the last 15 minutes before the shutdown. In this way a temperature profile and thus, indirectly, a load profile of the fuel cell system 2 can be produced. If, for example, the temperature was above the maximum cooling water temperature threshold value for 100% of the time within the predetermined time interval, then a continuous full load operation of the fuel cell system 1 occurred before the shutdown. If the cooling water temperature was below the lowest predetermined cooling water temperature threshold value for 100% of the time within the time interval, then 100% low load operation occurred. Between them, different partial load operating modes are possible, which are produced for example due to different holding periods for the cooling water temperature above one or the other cooling water temperature threshold value.

FIG. 2 illustrates an example of four such load states in the individual lines of the table, namely right at the top a full load state, right at the bottom a low load state and between them two states that should symbolize for example ⅓ load and ⅔ load. When the system is shut down before the actual switch-off operation, these values are evaluated and assigned to the classes shown here, for example class 1 for full load and class 4 for low load. The start preparation routine SVR, which then starts and/or the start preparation routine SVR that may still be running later if the temperatures in the surroundings of the vehicle 1 fall below the predetermined threshold temperature, can then be run, for example, under time control, so that a time $t_1$ is assigned to class 1, a time $t_2$ is assigned to class 2, etc. Accordingly, after a full load operation of the fuel cell system 2 a start preparation routine is actually not absolutely necessary or can be substantially curtailed. Thus, the time $t_1$ may either be 0 or may be different from 0, but is then very much less than the time $t_4$ of class 4, which corresponds to the low load situation before the shutdown of the fuel cell system 2. In this case the times are typically graduated, so that the time $t_1<t_2<t_3<t_4$. As a result it is possible, depending upon the operation of the fuel cell system 2 before the shutdown, to very simply and efficiently select a start preparation routine SVR suitable for minimization of the energy requirement, the noise emissions, and the duration of the start preparation routine SVR in so far as its typical time period t for the respective load state before the shutdown is used for carrying out the start preparation routine SVR. As a result, depending upon the load situation of the fuel cell system, significant curtailments can be achieved by comparison with a configuration which in each case operates with the system preparation routine corresponding to class 4, since this is urgently needed in order to ensure the cold starting capability even in all "worst case" scenarios which may occur.

In addition to the case described here, wherein the individual start preparation routines SVR differ only in their durations t, it is also possible in principle to vary the occurring speeds as an alternative or in addition to varying the duration t.

Furthermore, depending upon the class, for example, the same routine can be used as the start preparation routine SVR when the fuel cell system 2 is switched off and as the start preparation routine SVR for downtime conditioning of the fuel cell system 2. However, it is also conceivable to apply different routines here, for example with different times or for the case of downtime conditioning with correspondingly lower rotational speeds, in order to reduce the power requirement and the noise emissions. Also different operations of the start preparation routine SVR can be assigned to different classes, for example different pressure profiles or different times at which for example the valve devices 14, 16 are opened or closed.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

The invention claimed is:

1. A method for preparing a fuel cell system for a starting operation, the method comprising:
   detecting measured values;
   detecting a switching off of the fuel cell system and/or a temperature falling below a predetermined temperature threshold value; and
   performing a start preparation routine in order to discharge water and moisture from the fuel cell system and in response to the detection of the switching off of the fuel cell system and/or in response to the detection of the temperature falling below a predetermined temperature threshold value,
   wherein the start preparation routine is changed in accordance with the measured values detected within a predetermined time interval before the stopping of the fuel cell system,
   wherein the change to the start preparation routine is a change of a duration in time of the start preparation routine as a function of the measured values and/or is a change of rotational speeds of gas conveying equipment of the fuel cell system as a function of the measured values,
   wherein when the fuel cell system is operated at high load the duration of the start preparation routine is shorter than a duration when the fuel cell system is operated at a lower load, the gas conveying equipment is operated at a rotational speed lower than when the fuel cell system is operated at the lower load, or the start preparation routine is not performed,
   wherein when the fuel cell system is operated at the lower load the start preparation routine is performed for a predetermined maximum length of time or the gas conveying equipment is operated at a higher rotational speed than when the fuel cell is operated at a high load, and wherein the start preparation routine includes at least one intermediate stage between when the fuel cell system is operated at a high load and when the fuel cell system is operated at a lower load, wherein the measured values include cooling water temperatures in the fuel cell system, wherein different cooling water temperature threshold values are predetermined, wherein the measured values include the time for which the cooling water temperature was above a respective one of the different cooling temperature threshold values, and wherein the start preparation routine is changed based on an amount of the time during which the cooling water temperature was above a respective one of the different cooling temperature threshold values relative to an amount of time of the predetermined time interval before the stopping of the fuel cell system.

2. The method of claim 1, wherein the measured values at least indirectly record load requirements on the fuel cell system.

3. The method of claim 1, wherein the measured values are assigned to individual classes according to the load of the fuel cell system and/or cooling water temperature of the fuel cell system within the predetermined time interval, wherein a predetermined sequence of the start preparation routine is assigned to each of the individual classes.

4. The method of claim 1, wherein the predetermined time interval is 5-20 minutes before the shutdown of the fuel cell system.

5. The method of claim 3, wherein the measured values or the individual classes to which the measured values are assigned are associated with different start preparation routines based on a characteristic field.

6. A method for preparing a fuel cell system for a starting operation, the method comprising:

performing a start preparation routine in order to discharge water and moisture from the fuel cell system and in response to switching off of the fuel cell system and/or in response to a temperature falling below a predetermined temperature threshold value, wherein the start preparation routine is selected from a plurality of different start preparation routines based on measured values detected within a predetermined time interval before the stopping of the fuel cell system, wherein the measured values include water cooling temperatures in the fuel cell, and the start preparation routine is selected from a plurality of start preparation routines based on an amount of time the water cooling temperatures are above one of a plurality of predetermined cooling water temperature threshold values relative to an amount of time of the predetermined time interval, wherein a first of the plurality of different start preparation routines is selected when the fuel cell system is operated at high load, and wherein the first of the plurality of different start preparation routines has a duration that is shorter than a duration when the fuel cell system is operated at a lower load or during the first of the plurality of different start preparation routines gas conveying equipment of the fuel cell system is operated at a rotational speed lower than when the fuel cell system is operated at the lower load, wherein a second of the plurality of start preparation routines is selected when the fuel cell system is operated at the lower load, and wherein the duration of the second of the plurality of start preparation routines is a predetermined maximum length of time or during the second of the plurality of start preparation routines the gas conveying equipment is operated at a higher rotational speed than when the fuel cell is operated at a high load, and wherein a third of the plurality of start preparation routines is selected when the fuel cell system is operated at a load between the high load and the lower load, and wherein the third of the plurality of start preparation routines has a duration between the durations of the first and second start preparation routines or during the third of the plurality of start preparation routines the gas conveying equipment is operated at a rotational speed between the rotational speeds of the first and second start preparation routines.

7. The method of claim 6, wherein the measured values at least indirectly record load requirements on the fuel cell system.

8. The method of claim 6, wherein the measured values are assigned to individual classes according to the load of the fuel cell system and/or cooling water temperature of the fuel cell system within the predetermined time interval, wherein a predetermined sequence of the start preparation routine is assigned to each of the individual classes.

9. The method of claim 6, wherein the predetermined time interval is 5-20 minutes before the shutdown of the fuel cell system.

10. The method of claim 8, wherein the measured values or the individual classes to which the measured values are assigned are associated with different start preparation routines based on a characteristic field.

\* \* \* \* \*